Figure 1:
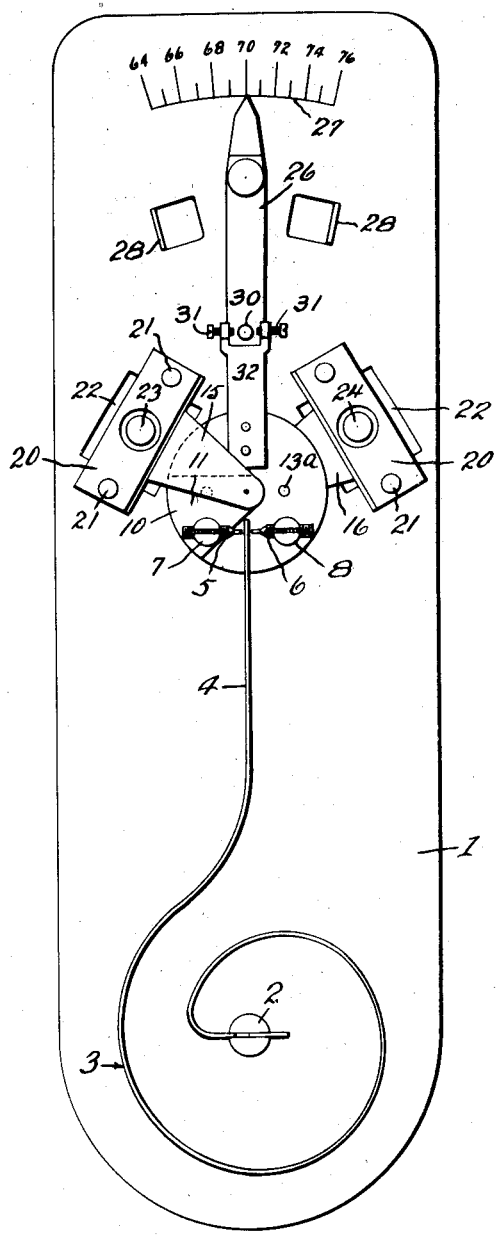

June 17, 1930.  M. RESEK  1,763,721

AUTOMATIC HEAT REGULATOR

Filed Dec. 4, 1926  3 Sheets-Sheet 1

Inventor
Marc Resek

By Hull, Brock & West
Attorney

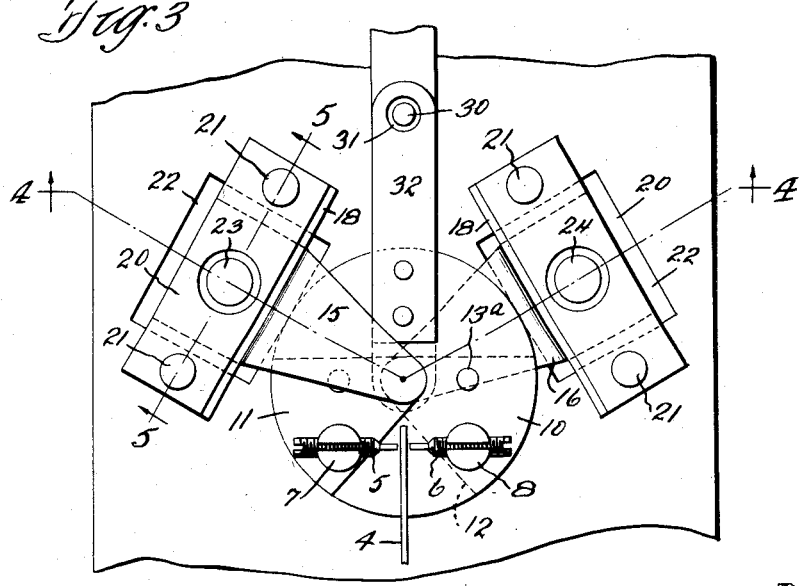
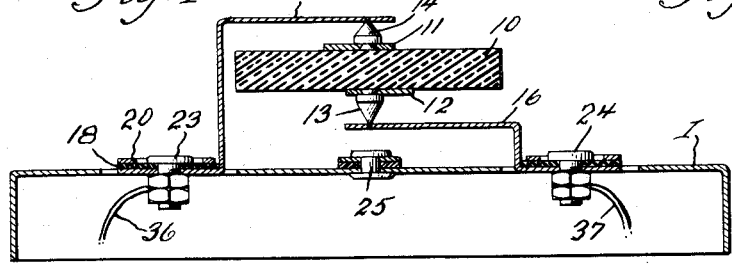
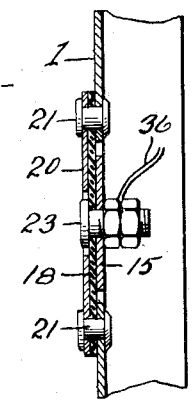
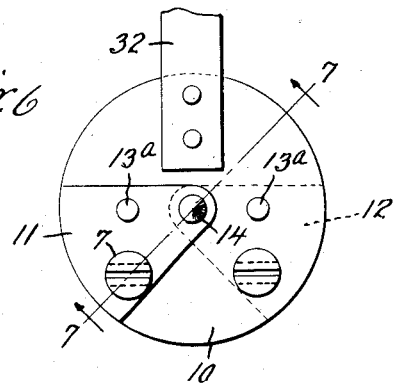
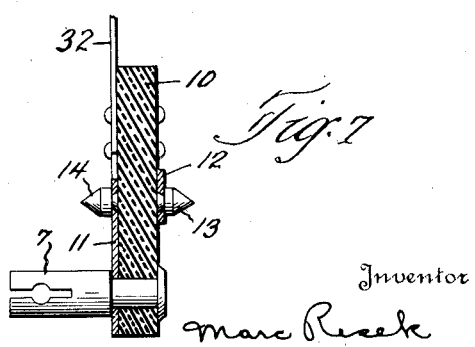

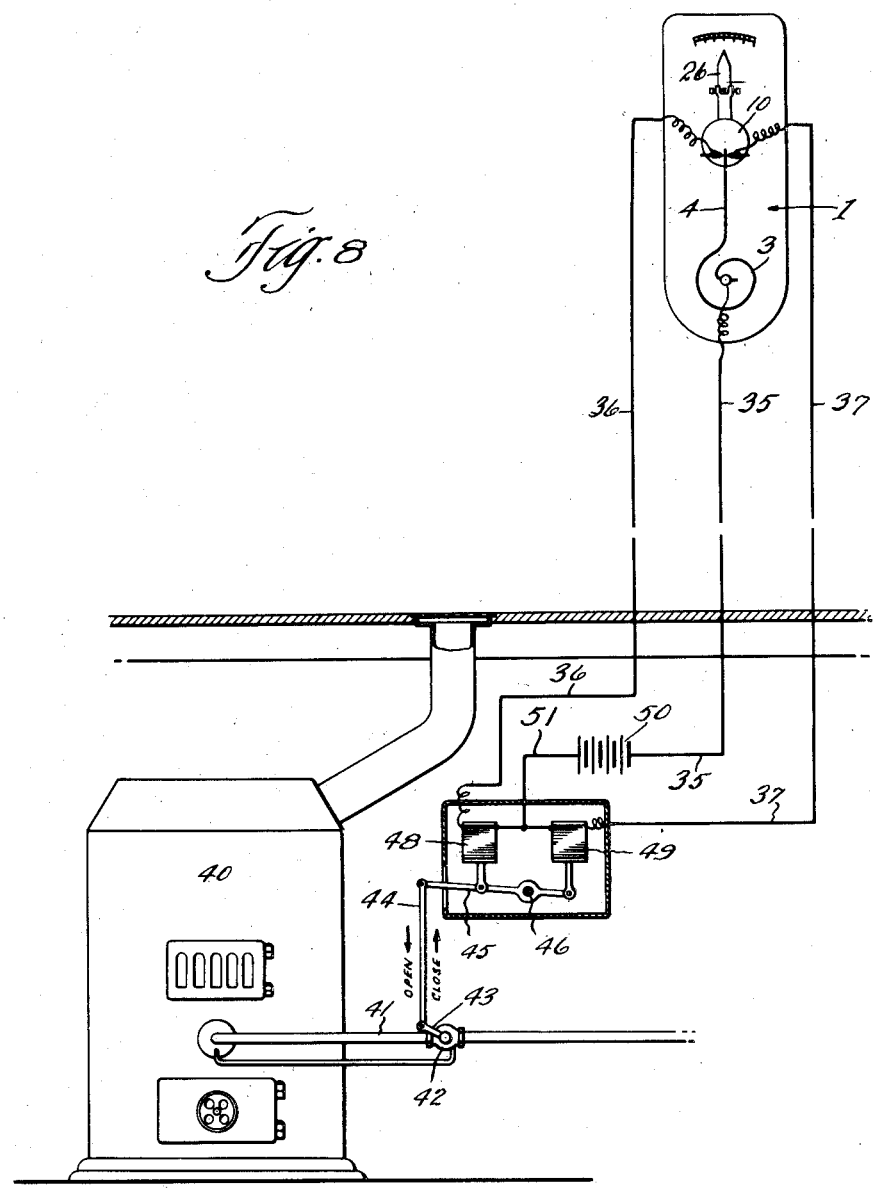

Patented June 17, 1930

1,763,721

UNITED STATES PATENT OFFICE

MARC RESEK, OF CLEVELAND HEIGHTS, OHIO, ASSIGNOR TO PERFECTION STOVE COMPANY, OF CLEVELAND, OHIO, A CORPORATION OF OHIO

AUTOMATIC HEAT REGULATOR

Application filed December 4, 1926. Serial No. 152,529.

This invention relates to improvements in automatic heat regulating systems, as well as to improvements in thermostatic instruments of the class used in connection with such systems.

Automatic regulating systems are employed with various kinds of heating plants, as coal, gas, or oil fired, hot air, steam, or hot water furnaces. In each case, the heating device is controlled by suitable mechanism that is governed by electrical means involving a branched circuit, one branch, when energized, effecting an increase, and the other, when energized, effecting a decrease in the heat produced by the device.

The function of the thermostatic instrument is to select the branches of the circuit accordingly as the temperature falls below or rises above a predetermined value thereby to cause an increase or a decrease in the heat production. To this end, the instrument comprises, generally, a thermosensitive element, as a bimetallic strip, involving a blade which is included in the main circuit, and two contact points that constitute the terminals of the respective branch circuits and between which said blade swings.

In operaion, after the thermosensitive element, responsive to a temperature condition above or below a predetermined range, acts to close the circuit through one of the aforesaid branches, there is, for obvious reasons, an appreciable lapse of time before arrest and reversal of the temperature gradation is effected, which lapse of time I may term "excess range" or "excess temperature range"; and during this period, the thermosensitive element, already in engagement with one of the contact points, is placed under tension even to the extent of distortion. Consequently, when the temperature gradation is reversed, another lapse of time occurs before the other branch circuit is closed because the thermosensitive element has to be first relaxed to normal condition and then swung to the oposite contact point, and this period or dwell I may refer to as the "lag of the thermostat."

It follows from the foregoing that, although the contact points may be set to a very fine adjustment—that is, as close the opposite sides of the thermosensitive element as practicable—there is a considerable fluctuation in the temperature due to both "excess range" and "lag".

The broad purpose of my invention is to improve the system by materially reducing this "excess range" so as to render more stable the temperature by practically eliminating the "lag" in the action of the thermostatic instrument; or, more specifically, to provide an instrument of the class in question that will operate without appreciable lag, thereby to maintain a relatively stable temperature.

To this end, according to the present preferred embodiment of the invention, the contact points of the instrument, normally in substantially fixed relation to each other (but desirably relatively adjustable for range variation), are shiftable as a unit under the pressure of the thermosensitive element so that while the element is moving in one direction it will engage one and carry both contact points with it, and as soon as the element is affected by a reverse change of temperature it will swing in the opposite direction and immediately engage the other contact point and impart to both a return movement.

A further object of my invention is to provide thermostatic means that is active within a predetermined limited temperature range to quickly effect a decrease in heat when the temperature rises, and likewise to effect an increase in heat when the temperature drops, so long as the temperature fluctuations occur within said predetermined range; and that is constant in its action to effect a decrease in heat when the temperature rises, or fluctuates, above said predetermined range, and that is similar in it action to effect an increase in heat when the temperature drops, or fluctuates, below said predetermined range.

This result is accomplished in the present instance by providing, what are, in effect, stops for limiting the movement of the contact points so that under the influence of the thermosensitive element, said contact points can be moved only a predetermined distance in either direction.

A still further object is to provide an adjustment through which the predetermined temperature range may be raised or lowered, and this consists of means for shifting the aforesaid stops; and another object is to provide means for varying the temperature range without disturbing the relation between the contact points and the thermosensitive element, and this is obtained in the present case by making the aforesaid stops adjustable.

The foregoing objects, with others hereinafter appearing and including efficiency, reliability, accuracy, durability, and relative simplicity and cheapness, are attained in the embodiment illustrated in the accompanying drawings wherein Fig. 1 is a front elevation, and Fig. 2 a sectional side elevation of my improved thermostatic instrument; Fig. 3 is an enlarged fragmentary front elevation and includes a modification of the lost-motion connection between the contact carrier and pointer; Figs. 4 and 5 are sectional details on the respective lines 4—4 and 5—5 of Fig. 3; Fig. 6 is a front elevation of the oscillating contact carrier; Fig. 7 is a section on the lines 7—7 of Fig. 6; and Fig. 8 is a diagram of the system.

Describing first the instrument, the same comprises a base or support 1 which may consist of a sheet metal stamping. Secured to the base or support adjacent one end is a post 2 to which is connected a thermosensitive element 3 involving a tongue 4. In the present instance the element consists of a strip of bimetallic metal and the blade 4 is formed of an integral part thereof, although any type of thermostatic element suitable for the purpose may be substituted therefor. The free end of the blade 4 is adapted to swing between and into engagement with contact points 5 and 6 which are shown in the nature of screws that are threaded through split posts 7 and 8, supported on an oscillating carrier 10. This carrier, in the present instance, consists of a disk of insulating material to the obverse and reverse sides of which are secured the respective segmental plates 11 and 12. Each post is extended through the carrier 10 and through one of the plates 11 or 12 and is riveted therebeyond, as shown in Fig. 7, wherefore electrical contact is made, in the one instance, between the post 7 and the plate 11, and in the other, between post 8 and plate 12. Rivets 13ª also serve to secure the plates in fixed position upon the carrier. Conical bearings 13 and 14 are secured to the inner ends of the respective plates 11 and 12, on the axis of the carrier 10, and these bearings engage within small holes in the ends of brackets 15 and 16. As shown particularly in Fig. 4, these brackets are Z-shaped and their bases underlie superposed strips 18 of insulating material and metallic plates 20 that are connected at their ends, by rivets 21, to the base or support 1 on opposite sides of openings 22. The brackets are thus insulated from the base as are also binding posts 23 and 24 that are secured to the bases of the respective brackets 15 and 16.

Pivotally connected to the base or support 1, as by a rivet 25, and coincident with the axis of the carrier 10, is a pointer 26 whose free end is arranged for cooperation with a scale 27 on the base or support, the pointer being limited in its swinging movement by stops 28 which rise from the base or support. A pin 30 projects from the pointer 26 and extends between adjustable stops 31, shown as screws, that are carried by the outer end of an arm 32 that is secured to the carrier 10, and because of the fact that the stops 31 are spaced apart a distance greater than the diameter of the pin 30, a lost-motion connection is effected between the pointer 26 and the carrier 10; and, carrying this thought further, and because the pointer 26 is connected to the base and the contact points 5 and 6 are mounted upon the carrier, there is, therefore, a lost-motion connection between the base or support and said contact points. A simplified form of this lost-motion connection is illustrated in Fig. 3 where the arm 32 is provided with an aperture 310 through which the pin 30 projects.

Figure 2:
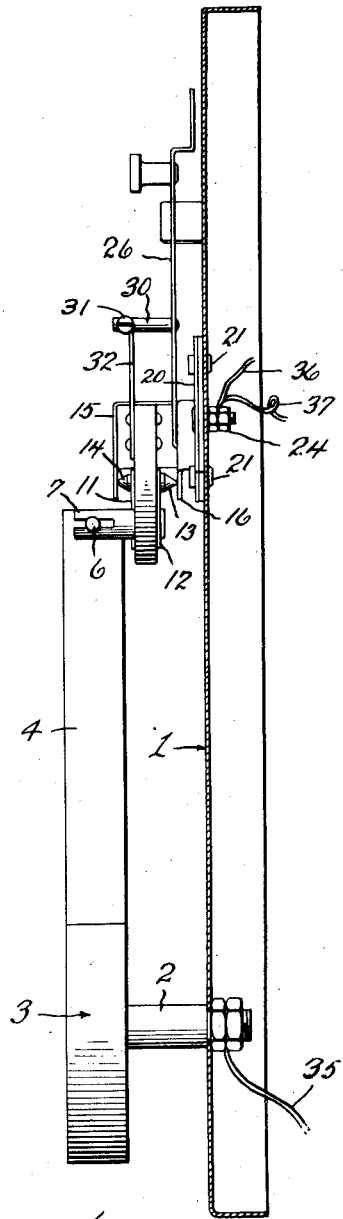

In the installation of an automatic heat regulating equipment involving the above instrument, an electrical conductor or wire 35 is connected to the post 2, preferably beneath the base or support 1, as shown in Fig. 2, and electrical conductors or wires 36 and 37 are connected to the respective binding posts 23 and 24, as shown particularly in Fig. 4. The wire or conductor 35 represents what I have hereinbefore referred to as the main circuit, while the branch circuits are represented by the wires or conductors 36 and 37, as will more fully appear hereinafter.

Assuming that the equipment is in operation, and that it is set as indicated by the pointer 26 to maintain a temperature of approximately 70°, when the temperature rises the matter of a degree or so above 70° the thermosensitive element will be so affected as to swing the blade 4 to the left and into engagement with the contact point 5. Immediately the mechanism controlling the heating appliance will be operated through the energization of the branch circuit represented by the wire or conductor 36 to reduce the heat, but before a change in temperature affecting the thermostatic element is effected the element continues to swing in the aforesaid direction and carry with it the contact point 5 and consequently the carrier 10 and the contact point 6, this being made possible by the lost-motion connection between the arm 32 and the pointer 26. In due time a change of temperature will occur which will cause the thermosensitive element to swing in the opposite direction and withdraw from the contact point 5 and almost immediately it will engage contact point 6 whereupon a circuit will be established through the branch circuit represented by the conductor 37 and the heating appliance will be affected in such a way as to increase the heat. The foregoing operation repeats itself each and every time the temperature rises or falls within a predetermined limited range, and inasmuch as there is no appreciable lapse of time between the swinging of the thermosensitive element from one contact point to the other, the fluctuations in temperature within said predetermined range will be relatively slight.

Now, in case the temperature drops below or rises above the aforesaid predetermined range, the thermosensitive element will engage the appropriate contact point and will remain in engagement therewith so long as the temperature remains beyond the limits of the aforesaid range, whether the temperature is advancing, is stationary, or is fluctuating. This is due to the stop mechanism comprised of the pin 30 and the abutments constituted of the opposed stops 31 on the arm 32.

The predetermined temperature range hereinbefore referred to may be raised or lowered, so to speak, by adjusting the pointer 26 thereby to bodily shift said stop mechanism; and the temperature range may be prolonged or curtailed by the adjustment of the stops 31.

In view of the foregoing description, the system, shown diagrammatically in Fig. 8, will be readily understood. The heating plant or apparatus 40 is represented as a hot air furnace that is fired by gas conducted to the furnace through a pipe 41. This pipe contains a valve 42 whose operating handle 43 is connected by a link 44 to a rocker arm 45, pivotally supported at 46. Connected to this rocker arm on opposite sides of its pivot are the cores of solenoids 48 and 49.

The wire or conductor 35 (representing the so-called main current) leads from a source of electric energy or battery 50 to the post 2. The respective wires or conductors 36 and 37 (representing the hereinbefore mentioned branch circuits) lead from the binding posts 23 and 24 to the windings of the solenoids 48 and 49. A wire or conductor 51 constitutes a return from said windings to the source or battery 50.

It will be seen, therefore, that when the instrument acts to close the branch circuit 36, the solenoid 48 will be energized to retract its core and rock the arm 45 in a direction to elevate the link 44 and, according to the legend associated with said link in the drawings, close the valve 42 thereby to shut down the fire. This will result in a lowering of the temperature in the room or compartment where the thermostatic instrument is located and eventually the instrument will be so affected as to close the branch circuit 37, energize the solenoid 49, and rock the arm 45 to open the valve, thereby to revive the fire and increase the heat delivered to the room or compartment.

The valve actuating mechanism, excepting as it enters broadly into the general system, constitutes no part of the present invention. Accordingly it is conventionally illustrated as comprised of the solenoids 48 and 49 and the rocker arm 45, and it will be understood that any of the well known mechanisms of this class may be used in lieu thereof.

So far as this invention is concerned, the contact points 5 and 6 of the thermostatic instrument bear a fixed relation to each other, although for practical reasons they are made adjustable within the posts 7 and 8 in accordance with common practice. For the purpose of claims, the two contact points may be regarded as one unit, and the thermostatic element, involving the blade 4, as a second unit.

Having thus described my invention, what I claim is:—

1. In an instrument of the character set forth, the combination of spaced contact points movable as a unit, a contact member arranged to swing between and into engagement with said contact points, stop means limiting the movement of the contact points to less than the possible movement of the contact member, and thermosensitive means for moving the contact member.

2. In an instrument of the character set forth, the combination of spaced contact points movable as a unit, a contact member arranged to swing between and into engagement with said contact points, stop means limiting the movement of the contact points to less than the possible movement of the contact member, an adjustment for said stop means, and thermo sensitive means for moving the contact member.

3. In an instrument of the character set forth, the combination of two units, one comprising spaced contact points that are held against movement with respect to each other and the other consisting of a contact member arranged to move between and into engagement with said contact points, stop means limiting the movement of one unit to less than the possible movement of the other unit, and means sensitive to and actuated by changing conditions for creating relative movement between the two units.

4. In an instrument of the character set forth, the combination of two units, one comprising spaced contact points that are held against movement with respect to each other and the other consisting of a contact member arranged to move between and engage the contact points, stop means limiting the movement of one unit to less than the possible movement of the other unit, an adjustment for said stop means, and means sensitive to and actuated by changing conditions for creating relative movement between the two units.

5. In an electrical contact instrument, the combination of two units, one a contact member and the other spaced contact points that are held against movement with respect to each other and between which said member is disposed, one of said units yielding to pressure between the member and one of the contact points whereby one unit shifts its position with respect to the other unit in response to said pressure, as and for the purpose specified.

6. In an electrical contact instrument, the combination of two units, one a contact member and the other spaced contact points that are held against movement with respect to each other and between which said member is disposed, one of said units yielding to pressure between the member and one of the contact points whereby one unit shifts its position with respect to the other unit in response to said pressure, and thermostatic means for moving one of the units.

7. In an instrument of the character set forth, the combination of two units, one comprising a thermostatic element and the other comprising two contact points that are spaced apart and are held against movement with respect to each other and into contact with which said element is adapted to swing, said two units having a differential movement.

8. In an instrument of the character set forth, the combination of two units, one comprising a thermostatic element and the other comprising spaced contact points between and into engagement with which said element is adapted to swing, one of said units yielding to pressure between the thermostatic element and one of the contact points whereby one unit shifts its position with respect to the other unit in response to said pressure, as and for the purpose specified.

9. In an instrument of the character set forth, the combination of a support, two units mounted thereon, one comprising a thermostatic element and the other comprising two contact points that are spaced apart and between and into contact with which said element is adapted to swing, and a lost-motion connection between one of said units and the support whereby said unit is capable of shifting its position with respect to the support in response to pressure of the thermostatic element on one of the contact points.

10. In an instrument of the character set forth, the combination of a movably supported carrier, spaced contact points on said carrier, and a thermostatic element arranged to swing between and into engagement with said points and capable, by reasons of excess pressure it may impose upon said points, of shifting said carrier, the contact points being held in fixed relation to and insulated from each other and from the thermostatic element.

11. In an instrument of the character set forth, the combination of a pivotally supported carrier, a pointer pivoted on substantially the pivotal axis of the carrier, a lost motion connection between the carrier and the pointer, spaced contact points on said carrier, and a thermostatic element arranged to swing between and into engagement with said points and capable, by reasons of excess pressure it may impose upon said points, of shifting said carrier, the contact points being insulated from each other and from the thermostatic element.

12. In an instrument of the character set forth, the combination of a base, a carrier pivotally mounted upon the base, spaced contact points supported immovably with respect to each other upon said carrier, and a thermostatic element secured to the base and involving a blade arranged to swing between and into engagement with said points and capable, by reasons of excess pressure it may impose upon said points, of shifting said carrier, the contact points being insulated from each other and from the thermostatic element.

13. In an instrument of the character set forth, the combination of a base, brackets mounted upon the base, a carrier pivotally supported by and between the brackets, contact points on said carrier, and a thermostatic element secured to the base and involving a blade arranged to swing between and into engagement with said points, the contact points being insulated from each other and from the thermostatic element.

14. In an instrument of the character set forth, the combination of a base, brackets mounted upon the base, a carrier pivotally supported by and between the brackets, contact points on said carrier, a thermostatic element secured to the base and involving a blade arranged to swing between and into engagement with said points, the contact points being insulated from each other and from the thermostatic element, a pointer pivotally supported by the base on an axis substantially coincident with the axis of the carrier, a lost motion connection between the pointer and the carrier, and a scale in operative relation to the pointer.

15. In an instrument of the character set forth, the combination of a base, a pair of brackets secured to the base and having opposed parts that are spaced from each other and are disposed in planes substantially parallel to the plane of the base, a carrier pivotally supported by and between said brackets, spaced contact points on said carrier, a thermostatic element secured to the base and involving a blade arranged to swing between and into engagement with said points, the contact points being insulated from each other and from the thermostatic element, a pointer pivoted to the base with its pivotal axis substantially coincident with that of the carrier, a lost motion connection between the carrier and said pointer, and a scale wherewith said pointer cooperates.

16. In an instrument of the character set forth, the combination of a base, brackets mounted upon and insulated from the base, a carrier having opposed bearing members journaled in said brackets and in electrical contact therewith, spaced contact points on said carrier and insulated from each other, one of said contact points being in electrical connection with one of the aforesaid bearings, a thermostatic element mounted upon the base and involving a part arranged to swing between and into engagement with said contact points, and electrical connectors, one in electrical contact with the thermostatic element and one in electrical contact with each of the brackets.

17. In an instrument of the character set forth, the combination of a base, brackets secured to and insulated from the base, said brackets having opposed parts, a carrier of insulating material disposed between opposed parts of the brackets, plates applied to the opposite sides of the carrier, each plate involving a bearing that is journaled within the adjacent bracket, spaced contact points mounted upon the carrier, each of which is in electrical connection with one of the aforesaid plates, means for connecting electrical conductors to the brackets, a thermostatic element mounted upon the base and involving a part that is arranged to swing between and into engagement with the contact points, and means for establishing electrical connection between the thermostatic element and an electrical conductor.

18. In an instrument of the character set forth, the combination of a base, brackets secured to and insulated from the base, said brackets having opposed parts, a carrier of insulating material disposed between the opposed parts of the brackets, plates applied to the opposite sides of the carrier, each plate involving a bearing that is journaled within the adjacent bracket, spaced contact points mounted upon the carrier, each of which is in electrical connection with one of the aforesaid plates, means for connecting electrical conductors to the brackets, a thermostatic element mounted upon the base involving a part that is arranged to swing between and into engagement with the contact points, means for establishing electrical connection between the thermostatic element and an electrical conductor, a pointer pivoted to the base on substantially the pivotal axis of the carrier, an arm secured to the carrier, the arm and said pointer having parts that are opposed to each other, and a protuberance on one of said parts, the other of said parts having opposed abutment surfaces between which the protuberance extends and which are spaced apart a distance greater than the breadth of the protuberance.

19. In an instrument of the character set forth, the combination of a base, brackets mounted upon and insulated from the base, said brackets having spaced apart overlying portions that are parallel to each other and to the plane of the base, a disk of insulating material disposed between the overlying portions of the brackets, metallic plates applied to opposite sides of the disk, contact points mounted upon the disk each of which is in electrical connection with one of said plates, a bearing on each of the plates that is journaled in the adjacent bracket, means for connecting electrical conductors to the brackets, a thermostatic element mounted upon the base and involving a part arranged to swing between and into engagement with the contact points, means for connecting an electrical conductor to the thermostatic element, a pointer pivoted to the base on substantially the pivotal axis of the aforesaid disk, an arm secured to the disk, the arm and said pointer having opposed parts, a pin extending from one of said parts, opposed stops carried by the other of said parts and between which said pin extends, the space between said stops being larger than the cross dimension of the pin whereby a lost motion connection is effected between the arm and the pointer, and a scale wherewith the pointer cooperates.

20. In an instrument of the character set forth, the combination of spaced contact points movable as a unit, a contact member arranged to swing between and into engagement with said contact points and capable, by reason of excess pressure it may impose upon said points, of shifting said points bodily as a unit, stop means limiting the movement of the contact points to less than the possible movement of the contact member, and thermosensitive means for moving the contact member, said stop means being adjustable whereby the permitted movement of the contact points may be varied.

21. In an instrument of the character set forth, the combination of a base, brackets mounted upon the base, a carrier pivotally supported by and between the brackets, contact points on said carrier, a thermostatic element secured to the base and involving a blade arranged to swing between and into engagement with said points, the contact points being insulated from each other and from the thermostatic element, a pointer pivotally supported by the base on an axis substantially coincident with the axis of the carrier, a variable lost motion connection between the pointer and the carrier, and a scale in operative relation to the pointer.

22. In an instrument of the character set forth, the combination of a base, brackets secured to and insulated from the base, said brackets having opposed parts, a carrier of insulating material disposed between the opposed parts of the brackets, plates applied to the opposite sides of the carrier, each plate involving a bearing that is journaled within the adjacent bracket, spaced contact points mounted upon the carrier, each of which is in electrical connection with one of the aforesaid plates, means for connecting electrical conductors to the brackets, a thermostatic element mounted upon the base involving a part that is arranged to swing between and into engagement with the contact points, means for establishing electrical connection between the thermostatic element and an electrical conductor, a pointer pivoted to the base on substantially the pivotal axis of the carrier, an arm secured to the carrier, the arm and said pointer having parts that are opposed to each other, and a protuberance on one of said parts, and opposed stops adjustably carried by the other of said parts and between which the protuberance extends.

In testimony whereof, I hereunto affix my signature.

MARC RESEK.